J. B. Lhote,
Glass Mold.
No. 91,946. Patented Jun. 29. 1869.

Witnesses:

Inventor;
Jean Baptiste Lhote
by his attorney
Pollok

United States Patent Office.

JEAN BAPTISTE LHOTE, OF PARIS, FRANCE, ASSIGNOR TO SEWELL HENRY FESSENDEN, OF BOSTON, MASSACHUSETTS.

Letters Patent No. 91,946, dated June 29, 1869.

IMPROVEMENT IN MOULDS FOR GLASS FROM GAS-CARBON OR GRAPHITE.

The Schedule referred to in these Letters Patent and making part of the same.

*To whom it may concern:*

Be it known that I, JEAN BAPTISTE LHOTE, of Paris, France, have invented certain new and useful Improvements in the Manufacture of Moulds for Moulding Glass or like Material; and I hereby declare the following to be a full, clear, and exact description of the same, reference being had to the accompanying drawings.

My invention consists in manufacturing the body of moulds for moulding glass, or like material, from the material which is formed in the interior of gas-retorts, and which is called "graphite," or "carbon," or "corrosion."

This material may be employed either in its natural state, or it may be agglomerated.

When I employ it in the state of agglomeration, I pulverize it, and I boil it for about half an hour, more or less, in neat's-foot oil and ammonia, say twenty-eight ounces of neat's-foot oil and seven ounces of ammonia; or the graphite, after being pulverized, may be agglomerated by an agglutinant, such as molasses, for example, say one part of molasses to three parts of powdered graphite.

I place this paste in a cast-iron tube, opening on a hinge and well luted. I submit it to a heat of 1,470° to 1,830° Fahrenheit, for about eight hours, more or less.

I then withdraw it from the fire, allow it to cool, remove the luting, open the tube, and take out the agglomerated graphite.

I do not limit myself to the preparation above described, for I can employ any binding-material which will agglomerate the graphite to form the mould.

When I employ the graphite in its natural state, as it comes from the retort, I dispense with the pulverization and agglomeration. I cut and work it so as to obtain the mould directly in its mass, the form of which mould will vary according to the article to be blown therein.

When moulds are required to blow articles of large size, I join, or connect, by screws or otherwise, several pieces of the graphite, so as to obtain a mass sufficiently large to form the mould.

In the annexed drawings—

Figure 1:
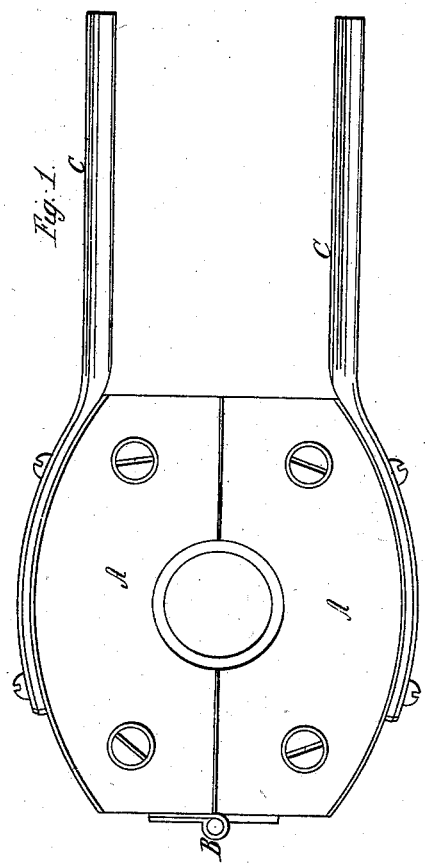
Figure 1 represents in plan a graphite mould.
Figure 2:
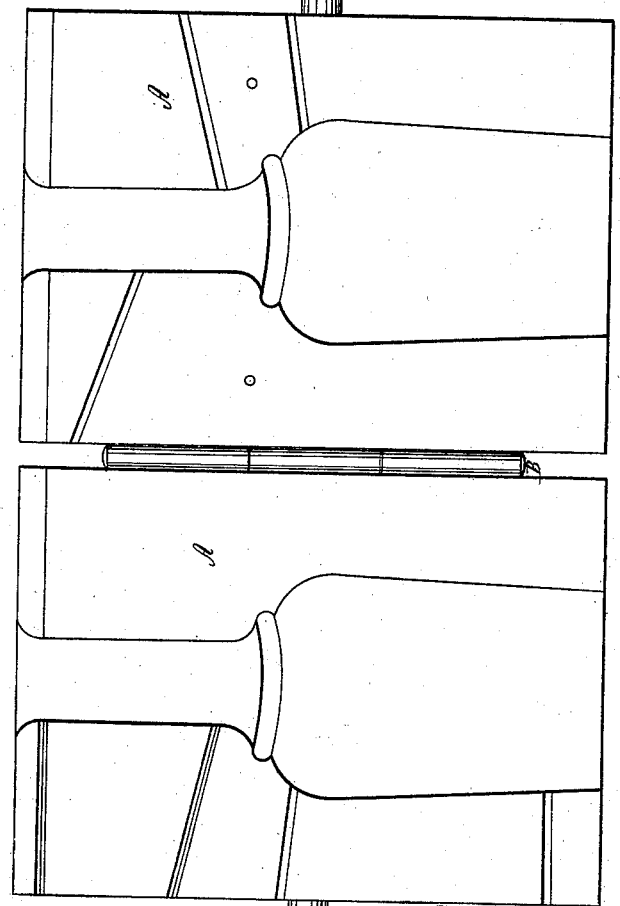
Figure 2 shows the mould open.

The mould is in two parts A A, which open on a hinge, B.

A strong piece of sheet-metal may be passed round the two parts of the mould; but this metal may be dispensed with, and the inner ends of the two arms, or handles, C C, for opening and closing the mould, may be secured by screwing directly to the graphite.

The interior configuration of the mould may be made to correspond with the form of any object desired to be moulded.

To prevent oxidation and rust, the sheet-metal before named and the arms C C may be galvanized; and having now described the nature of my invention, and the manner in which the same is or may be carried into effect,

What I claim, and desire to secure by Letters Patent, is—

1. Manufacturing the moulds, as hereinbefore described, from the graphite, or material which is formed in the interior of gas-retorts.

2. Manufacturing the moulds by pulverizing the graphite, and then agglomerating it by a binding-material, as hereinbefore described.

3. Manufacturing the moulds by cutting and working the graphite, in its natural state, into the required form, as hereinbefore described, without pulverizing and agglomerating it.

4. Manufacturing the moulds, especially when required to be of large size, by joining or connecting several pieces of the graphite, as hereinbefore described.

5. As a new manufacture, moulds made of the graphite, or material which is formed in the interior of gas-retorts, either in its natural state or agglomerated, substantially as specified.

In testimony whereof, I have signed my name to this specification before two subscribing witnesses.

J. B. LHOTE.

Witnesses:
RICE W. HARRIS,
C. LAFOND.